United States Patent Office 3,549,571
Patented Dec. 22, 1970

3,549,571
POLYESTER MODIFIED ORGANOSOL COMPOSITION, A DRIED COATING OF WHICH HAS IMPROVED MAR RESISTANCE AND METAL MARKING RESISTANCE
Charles J. Berg, Jr., Oak Lawn, Ill., James R. McInerney, San Salvador, El Salvador, and Daniel D. Moit, South Holland, Ill., assignors to The Sherwin-Williams Company, Cleveland, Ohio, a corporation of Ohio
No Drawing. Continuation-in-part of application Ser. No. 654,375, July 19, 1967, which is a continuation-in-part of application Ser. No. 619,057, Feb. 27, 1967. This application Jan. 17, 1969, Ser. No. 792,124
Int. Cl. C08g 17/16; C09d 3/66
U.S. Cl. 260—21
13 Claims

ABSTRACT OF THE DISCLOSURE

Normally water insoluble finely divided thermoplastic resins dispersed in organic solvents (organosols) which when heated will fuse into a continuous film are modified with polymeric polycarboxylic-polyhydric alcohol polyester resins with or without nitrogen containing cross linking agents to increase metal marking resistance and mar resistance, also to improve adherence, gloss and other properties. Compositions are especially useful when baked on aluminum, steel or galvanized steel, with or without a ground coat for siding, building sheet, awnings, roof shingles, interior curtain walls and appliances. They can also be used on other substrates, e.g., particle board, Crezon overlaid fibre board, and paper products.

---

This application is a continuation-in-part of our U.S. patent application Ser. No. 654,375, filed July 19, 1967, which is a continuation-in-part of U.S. patent application Ser. No. 619,057, filed Feb. 27, 1967, both now abandoned.

The term "organosol" as used herein refers to normally water insoluble thermoplastic resins dispersed in finely divided form in an organic liquid so that when the resultant composition is heated the resin particles will fuse together in a continuous film. The organic liquid in the composition is usually described as an organic solvent but the resins are considered to be highly dispersed as discrete particles rather than dissolved.

The use of organosols as coating compositions is well known but they suffer from serious deficiencies, especially with respect to metal marking and mar resistance. The compositions which have been prepared in the past usually consist of a vinyl dispersion resin, plasticizer, and a small amount of vinyl solution resin, together with small amounts of organic metal salts, epoxy resins and surfactants to control heat stability, viscosity, and other specific properties. Pigments are also included in these compositions. The solution resins have been considered necessary to obtain the required rheology for reverse roller coating application.

The usual marproofing agents, such as petroleum, high molecular weight waxes (Polymekon), polyethylene and silicones, are ineffective in promoting mar and metal marking resistance as compared with their normal effectiveness in coatings where the principal resin is in solution.

Numerous attempts have been made to overcome these deficiencies without much success. The normal approach to solving these problems has been the incorporation of thermoplastic solution resins, such as solutions of vinyl resins or acrylic resins. This has created numerous additional problems. Normally, the amount of plasticizer necessary to retain the expected degree of flexibility has been much higher than the percentage used in the basic, almost unmodified, organosol. Since the plasticizer is the least durable and the least desirable component, an increase in its proportion is objectionable. Furthermore, when the quantity of the vinyl solution resin or acrylic solution resin is increased to a point where satisfactory metal marking and mar resistance are obtained, the volume solids have to be decreased. At this point, the economic advantage of using the organosol is practically lost. Furthermore, other undesirable effects are encountered. Due to the presence of lower molecular weight thermoplastic resins, the heat stability is less. In addition, the solvents necessary to hold comparatively large amounts of such resins in solution are stronger, causing package stability problems with increasing viscosities.

One of the objects of the present invention is to provide a new and improved modified organosol coating composition which does not suffer from the disadvantages previously mentioned and which when applied to a metal or other substrate provides excellent coatings characterized by improved mar resistance, metal marking resistance and adeherence to a metal substrate, all while retaining flexibility and which may be used with or without a ground coat.

A further object of the invention is to provide a process for modifying organosols to obtain coating compositions in which the necessary flow characteristics for coating applications are obtained without the presence of even a small amount of solution vinyl resin, and with the percentage of plasticizer necessary being no higher than that used in the unmodified organosol, while retaining a completely acceptable degree of flexibility.

Another object is the provision of a composition and a process of the type described where, due to the elimination of most or all of the soluble thermoplastic resin and the much lower level of plasticizer required as compared to other types of modification, the resultant organosol has a distinct advantage in durability.

A still further object is to provide a composition and process of the type described in which the volume solids remain at a high level normally associated with organosols and none of the cost advantages are lost.

Still another object is the provision of compositions and a process of the type described wherein there is a gain in heat stability rather than a loss.

An additional object is the provision of coating compositions and a process of producing such compositions in which a polymeric polyester cross linked with a nitrogen containing resin, such as an amine resin, is employed as a modifying agent for an organosol to obtain properties normally associated with thermo setting films and superior to the corresponding properties obtained with organosols, especially improved solvent resistance and higher hardness. Other objects will appear hereinafter.

In accordance with the invention, organosols are modified with polymeric polyesters obtained by reacting a polycarboxylic acid or acid anhydride or lower alkyl ester of a polycarboxylic acid with a polyhydric alcohol with or without the addition of nitrogen containing cross linking agents and other modifying agents as hereinafter more fully described.

The invention is not limited to any particular type of organosol. The organosol resin must be thermoplastic, capable of being dispersed in finely divided particle form in an organic liquid and the resin particles must be capable of fusing together in a continuous film. Since the primary use of the resultant products is in coating compositions which form water insoluble coatings, the thermoplastic resins are normally water insoluble. Examples of suitable organosol resins are polyvinyl chloride (e.g., QYNV–1 and PVC–71), polyvinyl chloride-polyvinyl-acetate copolymers, polyethylene, polypropylene, polycarbonate resins, polyphenyl oxide resins, polyvinyl fluoride, polyvinylidine fluoride and polymethylmethacrylate. In copolymers, such as polyvinyl chloride-polyvinyl acetate resins, it is usually preferable to have a minor amount of acetate, for example, in the range of 0.5 to 10.0% by weight polyvinyl acetate.

The polyester resins employed to modify the organosol resins are either polyester resins or oil-free polyester resins further modified with fatty acid or fatty alcohol moiety. These resins have a plurality of hydroxyl groups capable of cross linking with amine aldehyde resins. The polyesters of the present invention are prepared by polymerizing organic dicarboxylic acids or anhydrides or lower alkyl esters of dicharboxylic acids with polyhydric alcohols. The polyesters of the present invention are branched by including a minimum of five mole percent of the polyhydric alcohols employed in their preparation as triols or alcohols of higher functionality. Mixtures of acids or mixtures of alcohols can be employed. Further, the polyester of the present invention contains from 25% to 60% aromatic content wherein the aromatic content is defined as the percent phenyl or phenylene moiety by weight in the polyester resin composition. It is obvious to those skilled in the art that other chain stiffening moiety may be incorporated in the polyester composition which serve the same purpose as the aromatic content. Such moiety includes cycloaliphatic, e.g., cyclohexyl or cyclopentyl, or triazine, e.g., melamine, radicals.

The method of preparing the polyesters is subject to variation and does not constitute a part of this invention.

As examples of dicarboxylic acids which can be employed in preparing the polymeric polyester, the following may be mentioned: o-phthalic or its anhydride, isophthalic, adipic, malonic, azelaic, hexahydrophthalic and its anhydride, endomethylene tetrahydrophthalic and its anhydride, hexachloroendomethylene tetrahydrophthalic and its anhydride, sebacic acid, hydrogenated dimerized vegetable fatty acids and diglycolic or thiodiglycolic acid. Obviously, the methyl esters of the dibasic acids listed could be utilized in the practice of this invention by means of reacting by transesterification versus the normal esterification route. The preferred dibasic acids in the practice of this invention are isophthalic blended with orthophthalic and/or adipic or azelaic as dictated by the flexibility required in the coating formulation.

The following diols are appropriated for the preparation of the polyester resin composition of the present invention: butylene glycol 1,4-bis-2-hydroxyethylthioether; butylene glycol 1,3; 1,4-cyclohexanedimethanol; dibromoneopentyl glycol; diethylene glycol; dipropylene glycol; bis-2-hydroxyethoxy Bisphenol A; 2,2-dimethyl-3-hydroxy propyl 2,2-dimethyl 1,3-hydroxy propionate; ethylene glycol; 1,6-hexanediol; hydrogenated Bisphenol A; methyl diethanolamine; neopentyl glycol; 1,5-pentanediol; propylene glycol; 2,2,4-trimethyl-3-pentanediol and ethoxylated or propoxylated diols or diamines. Cartain mon-oxiranes may be utilized, such as propylene oxide, butylene oxide, or oxides of the alpha olefins. The preferred diols in the practice of this invention are neopentyl glycol or 2,2,4-trimethyl-1,3-pentanediol.

The following polyols containing at least three hydroxyl groups are examples of such compounds which can be employed in making polyesters suitable for use in the practice of this invention: dipentaerythritol; glycerine; 1,2,6-hexanetriol; pentaerythritol; sorbitol; hydrogenated sugars; trimethylol ethane; trimethylol propane; and various ethoxylated and propoxylated triols and tetrols. Trimethylolethane and blends of trimethylolethane with other triols and tetrols are preferred.

As an example of a commercially available polyester which can be used in the practice of the invention there may be mentioned an oil modified polyester sold under the name Cyplex 1526. Where the polymeric polyester is modfied with fatty acid, examples of suitable fatty acid modifiers are: soybean, tung, oiticica, linseed, and dehydrated castor, the triglycerides of these fatty acids and mixtures of such oils and/or acids with saturated acids and oils (e.g., coconut oil). The oil modified polyester resins are prepared in a conventional manner and the method of preparation does not form a part of this invention. In general, where oil modified polyester resins are used, the unsaturated oil constitutes up to 60% by weight of the resin, preferably 30% to 50% by weight of the resin. Oil modified polymeric polyester resins made from phthalic anhydride, glycerine and a color retentive oil, such as coconut oil or dehydrated castor oil are satisfactory, but the best flexibility is not usually obtained with the oil modified polyester resins.

For most purposes the compositions of the invention are prepared with a hiding pigment. Examples of suitable pigments are titanium dioxide, phthalocyanine blue, phthalocyanine green, chrome yellow, chrome orange, ferrite yellow, red iron oxide, carbon black, chrome oxide green, quinacridone red and quinacridone violet. The proportion of hiding pigment in the composition will vary depending upon the type of pigment and ordinarily may be as low as 3% by weight for a black pigment and up to 40% by weight for a white pigment. Inert and extender pigments, e.g., silica aerogels, talcs, and diatomaceous silica, commonly used in organic coatings are suitable for controlling the gloss of the compositions.

The organic liquid carrier or solvent is preferably a high boiling ketone, for example, diisobutyl ketone (DIBK) and/or isobutylheptyl ketone, in combination with a high boiling aromatic or aliphatic naphtha. High boiling solvents are normally considered as those which have an initial boiling point over 150° C. or have an evaporation rate slower than that of a normal butyl acetate. While these are the preferred volatile carriers for practical application, it is possible to include some medium boiling solvents. It is also possible to replace all or part of the ketones with other oxygenated solvents.

The coating compositions produced in accordance with the invention can also contain plasticizers, such as, for example, dibutylphthalate, diisodecylphthalate (DIDP), dioctylphthalate, butylbenzylphthalate, Paraplex G–25 linear polyester, or Paraplex G–62 epoxidized oil.

The compositions of the invention can also contain heat stabilizers such as, for example, barium, cadmium and zinc organic salts alone or in combinatin with synergistic epoxy stabilizers or chelating agents. The use of such heat stabilizers is well known in the art.

In addition, the compositions of the invention can be prepared with nitrogen-containing cross linking agents, such as, for example, hexamethoxymethyl melamine and fusible urea-formaldehyde and melamine-formaldehyde resins.

The foregoing components of the coating compositions can be present in varying proportions, a general range of proportions being as follows:

| Components: | Percent by weight |
|---|---|
| Thermoplastic resin | 4–40 |
| Organic liquid carrier | 20–50 |
| Polyester solids | 2–40 |
| Pigment | Up to 40 |
| Heat stabilizer | 0–4 |
| Nitrongen-containing cross linking agent | [1] 0–30 |
| Plasticizer | 0–15 |

[1] Of polyester solids.

The proportions are controlled to give a total of 100% and a viscosity normally within the range of 200 centipoise to 10,000 centipoise on a Brookfield Viscometer at 25° C. The viscosity depends upon the method of application to be employed, for example, spraying, dipping or roller coating.

The relative proportions of polyester resin solids will usually be within the range of 5% to 90% of total resin solids.

It is also possible to include thermoplastic solution resins such as vinyl or acrylic in the composition, but this is normally not desirable because it may introduce deficiencies, such as reduced heat stability, higher viscosities and lower solids. Furthermore, when certain types of solution vinyl resins are employed, the metallic heat stabilizers cannot normally be used and these are the most efficient.

The invention will be further illustrated but is not limited by the following examples in which the quantities are given in parts by weight unless otherwise indicated.

EXAMPLE I (A) A polyester resin solution was prepared by mixing together 33 parts diisobutyl ketone, 32 parts polyester resin and 15 parts polyethylene gel (25% polyethylene by weight in isophorone). This mixture was ground to a Hegman fineness of 8H. The grinding can be carried out on a sand mill, roller mill, pebble mill or high speed mill. A solvent composed of 40 parts high flash aromatic naphtha (Solvesso 150), 30 parts isobutylheptyl ketone and 12 parts organic metal salt stabilizer (Ferro 6V6A) was added to the ground mixture in the mill.

(B) A pigment dispersion was prepared by grinding together 3 parts blown castor oil, 320 parts rutile titanium dioxide (du Pont R–960) and 32 parts antimony trioxide with components in A to a Hegman fineness of 7H. To this pigment dispersion was then added 30 parts diisobutyl ketone, 30 parts aromatic naphtha, 100 parts of the previously prepared polyester resin from A, 5 parts silica aerogel (Santocel 54 or Syloid 404) and 200 parts polyvinyl chloride dispersion resin. This mixture was further ground, dispersing the resin, to a Hegman fineness of 5H and then taken out of the mill.

(C) The mixture from B was added to a mixture of 100 parts of the aforementioned polyester resin solution from A, 40 parts aromatic naphtha, 37 parts isobutylheptyl ketone, 30 parts diisodecylphthalate, 40 parts melamine resin (Plaskon 3381) and 6 parts polyethylene glycol 400 monolaurate.

(D) The polyester resin used in A was made by reacting 24 parts of adipic acid, 42.2 parts neopentyl glycol, 40.8 parts isophthalic acid and 8.2 parts trimethylol propane, and was employed in the form of a solution composed of 60% solids and 40% solvent, the solvent being a mixture of 80% xylene and 20% monobutylether of ethylene glycol.

The composition prepared as above described was found to be excellent for use in forming a white pigmented coating on aluminum siding, building sheet of steel or aluminum and other metal substrate. It can be applied in any conventional manner and the resultant coating is baked so that a peak metal surface temperature of 375° F. is reached momentarily. The oven temperature can vary within a relatively wide range, for example, 350° F. to 800° F. but generally good results are obtained when the temperature of the substrate during baking reaches 350° F. to 375° F. momentarily.

In the foregoing composition the polyethylene gel imparts slip, improves metal mark resistance and also acts as an antisettling agent. Petrolatum or Polymekon wax can be substituted.

The silica aerogel is added to control gloss.

Other plasticizers can be used instead of the diisodecylphthalate, for example, dibutylphthalate, dioctylphthalate, and plasticizers of the type previously mentioned.

It may be mentioned that the composition described in the foregoing example produces what is generally called a low gloss coating.

EXAMPLE II (A) A polyester resin solution was prepared by mixing together 50 parts diisobutyl ketone, 54 parts high flash aromatic naphtha, 80 parts polyester resin solution of Example I–D, 16 parts polyethylene gel of the type used in Example I–A, 21 parts phthalocyanine green, 2 parts furnace black, 20 parts ferrite yellow, 3 parts blown castor oil, 2 parts antimony trioxide and 15 parts rutile titanium dioxide and the mixture was milled to a Hegman fineness of 6.5H.

(B) The following ingredients were added to the grinding mill containing the mixture described under A: 30 parts of diisobutyl ketone, 70 parts high flash aromatic naphtha, 80 parts polyester resin solution of Example I–D, 6 parts polyethylene glycol 400 monolaurate, 10 parts petrolatum solution, 15 parts silica aerogel, and 300 parts polyvinyl chloride. The resultant mixture was ground to a Hegman fineness of 4.5H while maintaining a temperature not over 100° F.

(C) The mixture from B was mixed with 40 parts diisobutyl ketone, 100 parts high flash aromatic naphtha, 4 parts hexamethoxymethyl melamine, and 18 parts of a barium-cadmium-zinc salt.

The resultant composition was a green polyester modified organosol containing about 24% polyester based on total binder solids. It is useful for the same purposes described with respect to the composition in Example I.

EXAMPLE III (A) 190 parts of the polyester solution of Example I–D was mived with 20 parts diisobutyl ketone, 20 parts aromatic naphtha, (Solvesso 150), 260 parts rutile titanium dioxide, 4 parts blown castor oil and 280 parts of a polyvinyl chloride resin (QYNV–1) and ground to a Hegman fineness of 7H.

(B) The composition from A was mixed with 180 parts polyester resin solution of Example I–D, 15 parts petrolatum wax, 28 parts hexamethoxymethyl melamine, 5 parts polyethylene glycol 400 monolaurate and 16 parts isophorone and ground to a Hegman fineness of 5H.

(C) The mixture from B was mixed with 27 parts diisobutyl ketone, 73 parts isobutylheptyl ketone, 59 parts aromatic naphtha (Solvesso 150), and 15 parts barium-cadmium-zinc salt stabilizer.

EXAMPLE IV (A) A mixture of 33 parts diisobutyl ketone, 30 parts of isobutylheptyl ketone, 92 parts of the polyester resin of Example I–D, 3 parts of blown castor oil, 300 parts rutile titanium dioxide (R–902) and 30 parts of antimony trioxide was ground to a Hegman fineness of 7H.

(B) To the mixture of A, there was added 6 parts of polyethylene glycol 400 monolaurate, 40 parts of the polyester resin of Example I–D, 70 parts of diisodecylphthalate, 30 parts aromatic naphtha, 30 parts diisobutyl ketone, 200 parts polyvinyl chloride dispersion resin (PVC 71) and 15 parts of silica aerogel (Santocel 54). The resultant mixture was ground to a Hegman fineness of 4H.

(C) To the product from B, there was added 100 parts of the polyester resin of Example I–D, 20 parts hexamethoxymethyl melamine, 15 parts of the barium-cadmium-zinc salt heat stabilizer, 15 parts of isophorone and 20 parts of a 50% solution of petrolatum in xylene.

This product gave low gloss coatings when applied to a metal substrate and baked as described in Example I.

EXAMPLE V (A) A mixture of 43 parts diisobutyl ketone, 42 parts aromatic naphtha (Solvesso 150), 33 parts of the polyester resin of Example I–D and 12 parts of the polyethylene gel of Example I–A was ground to a Hegman fineness of 8H. To the resultant mixture was then added 28 parts antimony trioxide, 275 parts titanium dioxide, (R–902), 3 parts blown castor oil and 22 parts barium-cadmium-zinc salt heat stabilizer, and the resultant mixture ground to a Hegman fineness of 7H.

(B) To the mixture of A there was added 43 parts of isobutylheptyl ketone, 60 parts aromatic naphtha, 5 parts silica aerogel (Santocel 54), and 375 parts polyvinyl chloride dispersion resin (PVC–71). The resultant mixture was ground to a Hegman fineness of 4.5H.

(C) To the product from B there was added 140 parts aromatic naphtha and one part melamine resin (Cymel 301). The resultant coating composition contained about 5% by weight of the total resin solids as polyester and 95% by weight of the total resin solids as polyvinyl chloride resin.

This composition was applied in the manner described in Example I to produce low gloss coatings on various types of metal substrate.

EXAMPLE VI (A) A mixture was prepared from 56 parts isobutylheptyl ketone, 48 parts aromatic naphtha (Solvesso 150), 16 parts polyepoxide (Epon 828), 6 parts polyethylene glycol 400 monolaurate, 3 parts blown castor oil, 20 parts petrolatum solution, 19 parts polyvinyl chloride-polyvinyl acetate resin containing about 10% acetate (VAGD), 250 parts rutile titanium dioxide, and 25 parts antimony oxide. This mixture was ground to a Hegman fineness of 7H.

(B) To the mixture of A was added 19 parts isobutylheptyl ketone, 29 parts aromatic naphtha, 173 parts of an oil modified alkyd resin obtained by the reaction of coconut oil, ethylene glycol, pentaerythritol and phthalic anhydride, 5 parts calcium carbonate pigment and 280 parts polyvinyl chloride dispersion resin (QYNM). The resultant mixture was ground to a Hegman fineness of 4.5H.

(C) The product from B was mixed with 16 parts butanol, 34 parts isobutylheptyl ketone, 90 parts of aromatic naphtha, 3 parts of organic chelating agent and 10 parts alkyl tin mercaptide heat stabilizing agent.

The resultant coating composition produced a high gloss coating when applied to a metal substrate and baked as described in Example I.

In the foregoing example, the oil modified resin was made from 40% phthalic anhydride, 12% ethylene glycol, 14% pentaerythritol and 34% of a coconut oil containing about 15% myristic acid and 85% capric acid.

EXAMPLE VII

A polyester resin solution was prepared as described in Example I. 133 parts of said solution was mixed with 78 parts of polyvinyl chloride dispersion resin (QYNV–1–10,000) and 300 parts of titanium dioxide pigment (CL–NC) and ground to a Hegman fineness of 7H.

To the resultant mixture was then added 210 parts polyester resin solution, 62 parts hexamethoxymethyl melamine (Cymel 301), 55 parts aromatic naphtha and 43 parts isophorone.

The resultant composition was applied to aluminum panels and baked as described in Example I. An excellent white pigmented coating was obtained.

The term "high gloss coating" as used herein refers to a gloss of at least 80 as measured on a 60° photo voltmeter.

The invention has a number of advantages. In the first place, the addition of the polymeric polycarboxylic-polyhydric alcohol resin to the organosol is made in a sufficient amount to improve the mar resistance and metal marking resistance of a dried coating of the resultant composition. Furthermore, by increasing the amount of the polyester resin, it is possible to improve the gloss of the resultant coating and to make high gloss coatings. In addition, one of the most significant advantages of the polyester modified organosol is its excellent adhesion to metal surfaces without a primer. Previously, the classic approach to the one-coat organosol has been the incorporation of large amounts of solution vinyl resins with interpolymerized carboxyl groups. The use of such solution vinyl resins restricted the use of the metallic type of heat stabilizer and as a result, the heat stability was so poor that the coatings were not practical for application and were never widely accepted. With the polyester modified organosol, there is no problem with heat stability and the adhesion is good. Furthermore, the invention makes it possible to obtain improved mar resistance, improved metal marking resistance and improved adherence, without destroying flexibility of the coating.

A further improvement in the practice of the invention is obtained by adding a cross linking agent, such as a nitrogen-containing compound like hexamethoxymethyl melamine or a fusible melamine-formaldehyde or urea-formaldehyde resin. Other nitrogen-containing cross linking agents containing a plurality of functional groups can be used including polyamines. As examples of other polyamines which are applicable to the practice of this invention one may list: aryl or alkyl substituted melamine, urea, ethylene diamine, diethylene triamine, triethylene tetramine and amine functional condensates with polybasic acids such as those listed hereinbefore. Also, the unsubstituted amides formed by the condensation of ammonia with polybasic acids such as those listed hereinbefore can be alkylolated and alkylated in like manner. The average effective functionality of the alkylated alkylol amines should be in excess of two, and preferably from 2.5–3.5.

Although alkylolation can be carried out with higher aldehydes, formaldehyde is preferred. The success with which alkylolation can be carried out is known to fall off rapidly as the higher homologues such as acetaldehyde, etc., are used. The use of higher homologues, however, should be included in the concept of this invention.

While essentially completely alkylated, monomeric alkylol amines are utilized in the preferred concept of this invention, the use of alkylol amine resins having relatively lower degrees of alkylation and higher degrees of condensation may be utilized providing the polyester is of sufficiently low hydroxyl functionality to avoid gelation. In general, polyesters with average functionalities less than 2.00 may be modified with normal butylated melamine resins without obtaining gels. The more the free alkylol groups and the higher the relative condensation, the lower the average functionality of the polyester required to avoid gelation or instability of the resultant alkylated alkylol amine modified polyester.

Organosols are normally completely thermoplastic and therefore have poor solvent resistance. By cross linking the polyester resin and a nitrogen-containing compound of the type described, the solvent resistance is significantly improved and the hardness is at level higher than that normally associated with the organosol.

Another advantage of the invention is that plasticizers can be reduced in amount and in some cases eliminated while retaining a completely acceptable degree of flexibility. The resultant products have a distinct advantage in durability, volume solids remain at the high level normally associated with organosols, and none of the cost advantages are lost. Because of the nature of the polyester resins used to modify the organosols there is a gain in heat stability rather than a loss. The organic liquid carriers or solvents which can be employed in making these compositions are such that excellent package stability is maintained.

In Examples I to V the heat stabilizer used was an organic barium-cadmium-zinc salt of a fatty acid (Ferro 6V6A). Other well known heat stabilizers, (e.g., Nuodex V1060) can be used, preferably those made by reacting inorganic hydroxides of barium, cadmium and/or zinc with fatty acids.

Epon 828 is an epichlorohydrin-bisphenol A resin.

The term "chelating agent" is used herein as defined in Hackh's Chemical Dictionary, Third edition. A chelating agent has a plurality of functional groups, e.g., —OH, —COOH and —COONa, capable of forming a ring structure with a heavy metal atom. Examples of chelating agents are ethylene diamine tetraacetic acid (EDTA), diethylene triamine pentaacetic acid (DTPA), and phosphoric acid chelating agents (e.g., Dequest 2000). Any of the organophosphonic acids disclosed in U.S. patents, 3,234,124; 3,288,846 and 3,336,221, can be used as chelating agents.

The compositions of the invention are especially useful when baked on aluminum, steel or galvanized steel, with or without a ground coat, for siding, building sheet, awnings, roof shingles, interior curtain walls and appliances. They can also be used on other substrates, e.g., particle board, Crezon overlaid fibre board, and paper products.

The invention is hereby claimed as follows:

1. A coating composition, a dried coating of which has improved mar resistance and metal marking resistance, comprising an organosol of an organic thermoplastic resin and a polymeric polycarboxylic polyhydric alcohol polyester resin selected from the group consisting of polymeric polyester resins and such resins further modified with a fatty acid or fatty alcohol, said polyester resins being obtained by polymerizing polyhydric alcohols with at least one compound from the class consisting of organic dicarboxylic acids, their anhydrides, and their lower alkyl esters, said polyhydric alcohols including a minimum of 5 mole percent of alcohols containing at least 3 hydroxyl groups, and said polyester having 25% to 50% by weight of a chain stiffening moiety from the group consisting of phenyl, phenylene, cycloaliphatic and triazine radicals, the quantity of said polyester resin being sufficient to improve the mar resistance and metal marking resistance of a dried coating of said composition.

2. A composition as claimed in claim 1 comprising 4–40% by weight of an organosol of an organic thermoplastic resin, 20–50% by weight organic liquid carrier, 2–40% by weight of said polymeric polycarboxylic polyhydric alcohol polyester resin, 0–40% by weight pigment, 0–4% by weight heat stabilizer, 0–30% by weight of a nitrogen-containing cross linking agent based on the weight of the polyester resin solids, and 0–15% by weight plasticizers, said composition having a viscosity within the range of 200 centipoises to 10,000 centipoises on a Brookfield viscometer at 25° C.

3. A composition as claimed in claim 1 in which the amount of said polyester resin is at least 5% by weight based on the weight of the total resin solids.

4. A composition as claimed in claim 1 in which the amount of said polyester resin is within the range of 5–90% by weight of the total resin solids.

5. A composition as claimed in claim 1 in which said organosol is a dispersion of polyvinyl chloride in a water insoluble organic liquid carrier.

6. A coating composition as claimed in claim 1 in which said polyester resin is an oil-free polyester resin.

7. A coating composition as claimed in claim 6 in which said oil-free polyester resin is made by reacting adipic acid, neopentyl glycol, isophthalic acid and trimethylolpropane.

8. A coating composition as claimed in claim 1 in which said polyester resin is an oil-modified polyester resin.

9. A coating composition as claimed in claim 8 in which said oil-modified polyester resin is obtained by the reaction of coconut oil, ethylene glycol, pentaerythritol and phthalic anhydride.

10. A coating composition as claimed in claim 1 which contains a nitrogen-containing cross linking agent in an amount sufficient to increase the solvent resistance of said coating.

11. A coating composition as claimed in claim 10 in which said nitrogen-containing cross linking agent is from the class consisting of hexamethoxymethyl melamine and fusible urea-formaldehyde and melamine-formaldehyde resins.

12. A coating composition as claimed in claim 10 in which said nitrogen-containing cross linking agent is hexamethoxymethyl melamine.

13. A coating composition as claimed in claim 1 which comprises a liquid carrier from the class consisting of high boiling ketones and high boiling aromatic and aliphatic naphtha.

References Cited

UNITED STATES PATENTS

| | | | |
|---|---|---|---|
| 3,137,666 | 6/1964 | Lox et al. | 260—19 |
| 3,300,543 | 1/1967 | Turner | 260—835 |
| 3,310,512 | 3/1967 | Curtice | 260—850 |
| 3,376,242 | 4/1968 | Clemens | 260—22 |
| 3,376,246 | 4/1968 | Valentine et al. | 260—31.6 |
| 3,419,511 | 12/1968 | Condo et al. | 260—22 |

DONALD E. CZAJA, Primary Examiner

R. W. GRIFFIN, Assistant Examiner

U.S. Cl. X.R.

117—72, 75, 132, 140, 155, 161, 167; 260—18, 22, 23, 28, 28.5, 31.8, 32.8, 33.4, 33.6, 39, 40, 41, 850, 851, 853, 873